(12) United States Patent
Lesiewicz et al.

(10) Patent No.: US 9,817,853 B1
(45) Date of Patent: Nov. 14, 2017

(54) DYNAMIC TIER-MAPS FOR LARGE ONLINE DATABASES

(71) Applicant: GOOGLE INC., Mountain View, CA (US)

(72) Inventors: Patryk Lesiewicz, Cracow (PL); Kamil D. Skalski, Cracow (PL)

(73) Assignee: GOOGLE LLC, Mountain View, CA (US)

( * ) Notice: Subject to any disclaimer, the term of this patent is extended or adjusted under 35 U.S.C. 154(b) by 782 days.

(21) Appl. No.: 14/182,669

(22) Filed: Feb. 18, 2014

Related U.S. Application Data

(63) Continuation of application No. 13/556,683, filed on Jul. 24, 2012, now Pat. No. 8,700,583.

(51) Int. Cl.
*G06F 17/30* (2006.01)

(52) U.S. Cl.
CPC ............... *G06F 17/30321* (2013.01)

(58) Field of Classification Search
CPC .................................................. G06F 17/30321
See application file for complete search history.

(56) References Cited

U.S. PATENT DOCUMENTS

| | | |
|---|---|---|
| 5,864,863 A | 1/1999 | Burrows |
| 6,021,409 A | 2/2000 | Burrows |
| 6,839,700 B2 | 1/2005 | Doyle et al. |
| 7,441,096 B2 | 10/2008 | Kitamura |
| 7,506,338 B2 | 3/2009 | Alpern et al. |
| 7,596,571 B2 | 9/2009 | Sifry |
| 7,627,613 B1 | 12/2009 | Dulitz et al. |
| 7,668,825 B2 | 2/2010 | Vogel et al. |
| 7,925,655 B1 | 4/2011 | Power et al. |
| 8,024,285 B2 | 9/2011 | Bilenko et al. |
| 8,417,688 B2 | 4/2013 | Abbondanzio et al. |
| 2002/0184380 A1 | 12/2002 | Weider et al. |
| 2002/0194184 A1 | 12/2002 | Baskins et al. |
| 2003/0078913 A1 | 4/2003 | McGreevy |
| 2003/0135495 A1 | 7/2003 | Vagnozzi |
| 2003/0191627 A1 | 10/2003 | Au |

(Continued)

OTHER PUBLICATIONS

Non-Final Office Action Response for U.S. Appl. No. 13/556,683, filed Nov. 4, 2013, 19 pages.

(Continued)

*Primary Examiner* — Scott A Waldron
(74) *Attorney, Agent, or Firm* — Brake Hughes Bellermann LLP

(57) ABSTRACT

Systems and methods for managing a tier-map of key items are disclosed. A system may include tiers having at least one tier limit, an indexing tier-map that maps key items to one of the tiers and a serving tier-map that maps key items to one or more of the tiers. The system may also include a memory storing instructions that cause a processor to perform operations. The operations may include using the indexing tier-map to determine that a particular key item is mapped to a first tier, determining that an amount of associated items for the particular key item approaches the tier limit, and updating the indexing tier-map to map the particular key item to map to a second tier. The operations may further include identifying a new associated item for the particular key item and storing the new associated item with the particular key item in the second tier.

19 Claims, 4 Drawing Sheets

(56) References Cited

U.S. PATENT DOCUMENTS

| | | |
|---|---|---|
| 2005/0102270 A1 | 5/2005 | Risvik et al. |
| 2005/0203924 A1 | 9/2005 | Rosenberg |
| 2005/0266926 A1 | 12/2005 | Kesselman et al. |
| 2006/0074962 A1* | 4/2006 | Fontoura ............ G06F 17/30864 707/999.102 |
| 2006/0218123 A1 | 9/2006 | Chowdhuri et al. |
| 2006/0268742 A1 | 11/2006 | Chu et al. |
| 2007/0033165 A1 | 2/2007 | Sheinwald et al. |
| 2007/0050393 A1 | 3/2007 | Vogel et al. |
| 2007/0112755 A1 | 5/2007 | Thompson et al. |
| 2007/0156677 A1 | 7/2007 | Szabo |
| 2008/0091670 A1 | 4/2008 | Ismalon |
| 2008/0146338 A1 | 6/2008 | Bernard et al. |
| 2008/0228743 A1* | 9/2008 | Kusnitz ............. G06F 17/30622 707/999.004 |
| 2009/0112843 A1* | 4/2009 | Hsu .................. G06F 17/30011 707/999.005 |
| 2012/0130996 A1 | 5/2012 | Risvik et al. |
| 2012/0173510 A1 | 7/2012 | Risvik et al. |
| 2012/0198107 A1 | 8/2012 | McKean et al. |

OTHER PUBLICATIONS

Notice of Allowance for U.S. Appl. No. 13/556,683, mailed Nov. 22, 2013, 21 pages.
Non-Final Office Action for U.S. Appl. No. 13/556,683, mailed Aug. 7, 2013, 24 pages.

* cited by examiner

DYNAMIC TIER-MAPS FOR LARGE ONLINE DATABASES

RELATED APPLICATION

This application is a continuation of, and claims priority to, U.S. patent application Ser. No. 13/556,683, filed Jul. 24, 2012, now U.S. Pat. No. 8,700,583, the disclosure of which is incorporated herein by reference.

BACKGROUND

Many databases determine where to store data depending on certain properties of the data, such as how often the data is requested or how often it appears in various sources. For example, in a database that indexes phrases appearing in a body of documents, the system may store phrases that appear most frequently in one type of storage and phrases that rarely appear in documents in another type of storage. Such disparate locations may be referred to as tiers. Key items, such as phrases, may be assigned to a tier based on the number of associated items, such as documents, the key item has. The mapping of key items to a tier may be referred to as a tier-map and the tier storing a key item may indicate how popular the item is. For example, a low level tier may map to key items with less than 100 associated items while the top level tier may store key items that have millions of associated items. In some systems tiers may limit the number of associated items that a key item may have in the tier. For example, if a key item resides in tier 0 it may not have more than 100 associated items. If a new association arises for a key item in tier 0 that already has 100 associated items the system cannot store the new association until the key data item migrates to a tier that allows a larger number of associated items. This delay may result in data loss. In some systems, the tier map can be taken offline to migrate the key items to a new tier. However, in an always-live system dealing with hundreds of billions of records, where associated items are added and updated on a rolling basis, a taking the tier map offline for a full migration of all the records associated with a particular key item can be impractical or even impossible.

SUMMARY

One aspect of the disclosure can be embodied in a method that includes storing, in a memory, an indexing tier-map that associates key items with one of a plurality of tiers and a serving tier-map that associates key items with one or more of the plurality of tiers, each tier of the plurality of tiers having an associated limit for associations per key item. The method may also include identifying a first tier assigned to a particular key item based on the indexing tier-map, determining, by one or more processors, whether an amount of associated items approaches the limit for the first tier, and updating the indexing tier-map to assign the particular key item to a second tier when the amount of associated items approaches the limit. In some implementations the method may also include receiving a new associated item for the particular key item, storing the particular key item with the new associated item in the second tier, and updating the serving tier-map so that the particular key item is assigned to the first tier and to the second tier in the serving tier-map. In some implementations the particular key item may be a term and the associated items may be document identifiers for documents that contain the term.

The method may include one or more additional aspects. For example, in some implementations the method may also include updating at least some of the associated items stored with the particular key item in the first tier and, in response to updating the at least some associated items, moving the at least some of the associated items from the first tier to the second tier. In some implementations the method may include updating the associated items for the particular key item that are stored on the first tier, moving the associated items from the first tier to the second tier, and updating the serving tier-map to remove the assignment of the particular key item to the first tier. Updating the serving tier-map may occur as part of a maintenance process performed on the serving tier-map.

The method may also include receiving another new associated value for the particular key value, using the indexing tier-map to identify that the particular key value is assigned to the second tier, determining that the amount of associated items for the particular key item approaches the limit for the second tier, updating the indexing tier-map to assign the particular key item to a third tier, and storing the new associated item with the particular key item in the third tier. Updating the indexing tier-map to map the particular key value to the second tier and updating the indexing tier-map to map the particular key value to the third tier may occur on the same day.

In some implementations the memory may also store a frequency map. In such implementations the amount of associated items may be determined by querying the frequency map for the amount. In some implementations determining whether the amount of associated items approaches the limit for the first tier and updating the indexing tier-map may occur in response to receiving the new associated item or may occur as part of a scheduled periodic process. In some implementations, the memory may also store an index comprising a plurality of segments and, for each segment, the indexing tier-map may associate key items with one of the plurality of tiers the serving tier-map may associate key items with one or more of the plurality of tiers. In some implementations determining whether the amount of associated items approaches the limit may include determining whether the amount is within a predetermined quantity of the limit.

In another aspect, any of the methods may be recorded and embodied in a computer-readable storage medium storing instructions executable by one or more processors.

In another aspect, a system for managing a tier-map includes tiers stored in a memory, including a first tier and a second tier. Each tier may have at least one tier limit and may store key items and one or more associated items for each key item. The system may also include an indexing tier-map that maps key items to one of the tiers stored in the memory and a serving tier-map that maps key items to one or more of the tiers stored in the memory. The system may further include a memory storing instructions; and a processor configured to execute the instructions. The instructions may cause the processor to perform operations. The operations may include using the indexing tier-map to determine that a particular key item is mapped to the first tier, determining that an amount of associated items for the particular key item approaches the limit for the first tier, and updating the indexing tier-map to map the particular key item to second tier in response to the determining. The operations may also include identifying a new associated item for the particular key item, and storing the new associated item with the particular key item in the second tier.

The system may also include one or more additional aspects, for example, the operations may also include updating the serving tier-map so that the serving tier-map associates the particular key item to the second tier and to the first tier. In some implementations the operations may include receiving a query that includes the particular key item and using the serving tier-map to determine that the first tier and the second tier each store associated items for the particular key item. In some implementations the first tier may be stored in a memory device that differs from the second tier.

In another aspect, an indexing system may include one or more processors and one or more network connections configured to communicate with a serving cluster. The serving cluster may include a search index organized into a plurality of segments, with each segment having a plurality of tiers that store key items with associated items. The system may also include a memory storing an indexing tier-map and a serving tier-map, the indexing tier-map and the serving tier-map each assigning a particular key item to a first tier. The system may also include one or more memories storing instructions that, when executed by the one or more processors, cause the indexing system to perform operations. The operations may include determining an amount of associated items for the particular key item, determining whether the amount approaches a limit for the first tier, and replacing the assignment of the particular key item to the first tier with an assignment of the particular key item to a second tier of the plurality of tiers when it is determined that the amount approaches the limit.

These and other aspects can include one or more of the following features. For example, the operations may include identifying a new associated item for the particular key value, storing the new associated item with the particular key value in the second tier, and updating the serving tier-map so that the particular key item is assigned to the first tier and to the second tier. In some implementations the serving tier-map may store the assignments for the key items by segment. In some implementations the plurality of segments may be updated on a rolling basis. In some implementations the search index may include at least a billion entries. In one implementation as part of an update for a particular segment that includes the particular key item, the associated items for the particular key item stored in the segment are moved from the first tier to the second tier; and the serving tier-map is updated to remove the assignment of the particular key item to the first tier.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

A system is provided for creating dynamic tier-maps that allow a key item to move up or down a tier without having to interrupt system response time with a complete mapping refresh. The dynamic tier-map system may include a frequency map that tracks the total number of associations for a particular key item. This number may be used to determine the appropriate tier for a key item. In some implementations the frequency map stores the frequency of each key item for each segment of the index. The frequency map may be updated as associations are added to or deleted from the index or may be generated daily. When the frequency map counter for a particular key item approaches a tier boundary limit, whether an upper or a lower limit, the system may begin to shift the key item associations to a new tier.

To accomplish this migration, disclosed implementations may use an indexing tier-map and a serving tier-map. The indexing tier-map may be built periodically, such as daily, based on the frequency map and may map key items to tiers. In other words, the indexing tier-map may tell an indexing system the tier where a new associated item for a particular key item will be stored. Therefore, the indexing tier-map associates each key item to one tier at a time. In some implementations, the system may update the indexing tier-map during the day as the number of associated items for a key item approaches a tier limit. In some implementations, the indexing tier-map may be updated once per period, for example once per day.

The serving tier-map may be used to process queries submitted to the index and may allow the query processor to locate all associations for a key item. The serving tier-map may be built as portions of the index, or segments, are refreshed and may contain a tier assignment for each key item by segment. In other words, in the serving tier-map a key item (e.g. a phrase) may be mapped to more than one tier, depending on the segment. For example, a key item stored in segment A may be mapped to tier 0 while the same key item stored in segment B may be mapped to tier 1. During a segment refresh the system may use the indexing tier-map to determine what tier a key item currently maps to and, if this differs from the tier the key item is currently assigned to in the segment, the system may move the key items in the segment to the new tier and update the serving tier-map to reflect the new assignment. When all segments that contain the key item have been refreshed the migration is complete.

Figure 1:
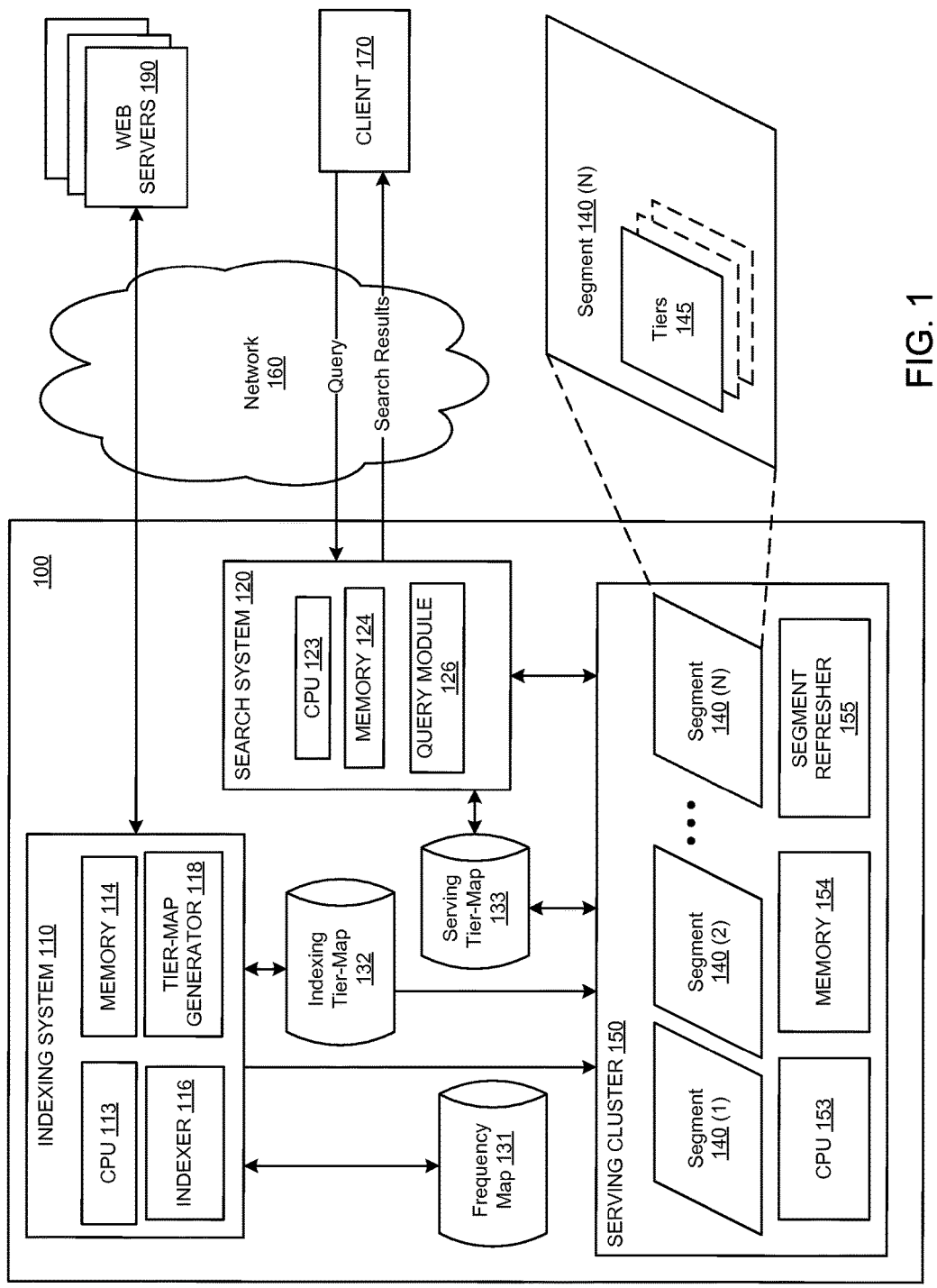
FIG. 1 illustrates an example system in accordance with the disclosed subject matter.

FIG. 1 is a block diagram of a distributed indexing system 100 in accordance with an example implementation. The system 100 may be used to implement a dynamic tier-map using the techniques described herein. The depiction of system 100 in FIG. 1 is described as an Internet-based search engine with an inverted index having, by way of example, posting lists that include terms or phrases as key items and document identifiers as associated items. Documents may include any type of files with content, including web pages, PDF documents, word-processing documents, spreadsheets, text files, images, sound files, JavaScript files, etc. Other network configurations and applications of the described technology may be used. For example, the search engine may be used to search any repository, such as content stored on portable devices, documents on networked drives, content in document management systems, etc.

Figure 4:
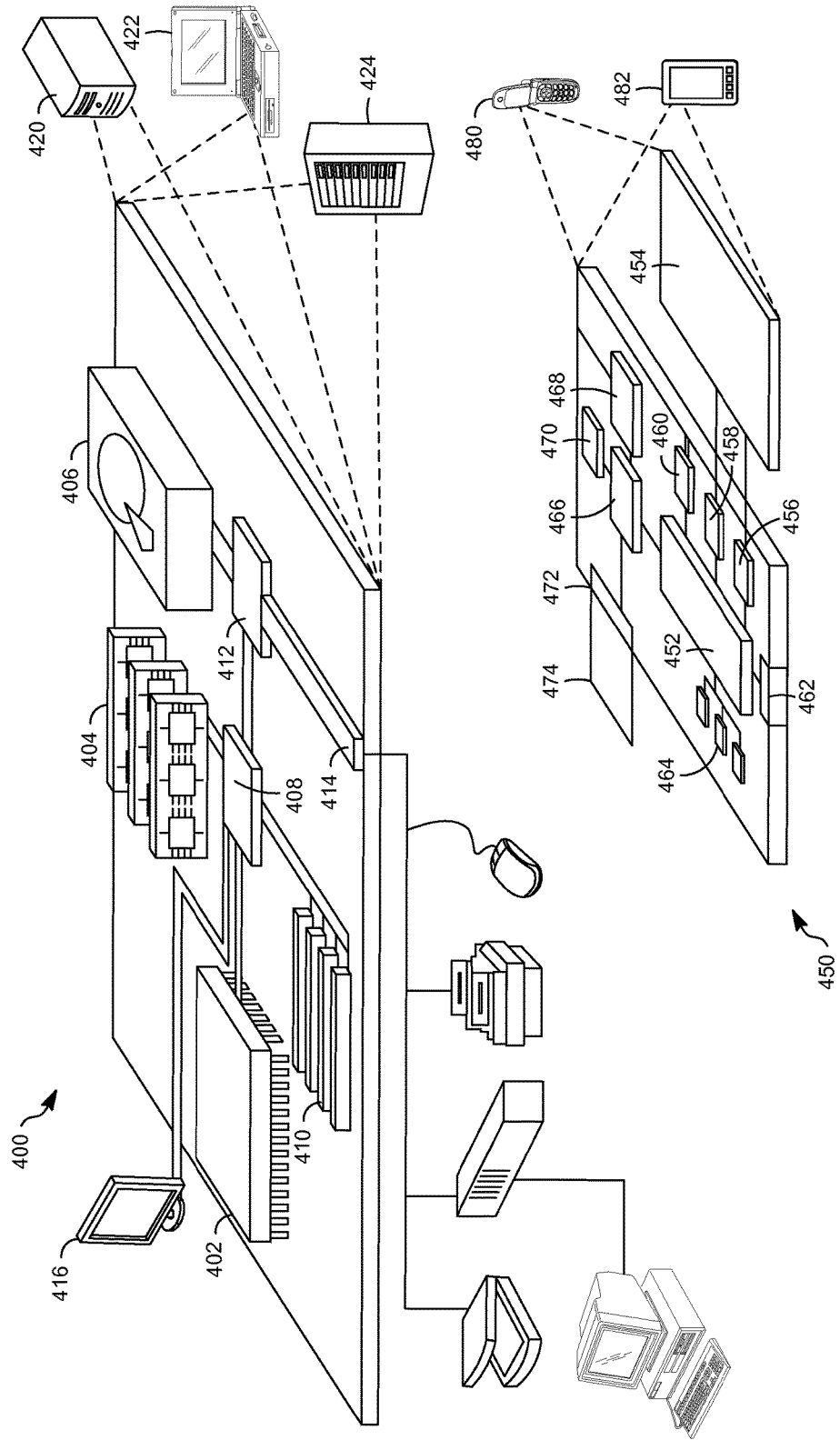
FIG. 4 shows an example of a computer device that can be used to implement the described techniques.

The distributed indexing system 100 may include indexing system 110, search system 120, and serving cluster 150. Indexing system 110, search system 120, and serving cluster 150 may be computing devices that take the form of a number of different devices, for example a standard server, a group of such servers, or a rack server system. In addition, indexing system 110, search system 120, and serving cluster 150 may be implemented in a personal computer, for example a laptop computer. The indexing system 110, search system 120, and serving cluster 150 may be examples of computer device 400, as depicted in FIG. 4.

Serving cluster 150 may be a single computing device or a distributed database system with one or more computing devices, each with its own processor 153 and memory 154. The number of computing devices that comprise serving cluster 150 can vary and, for the sake of brevity, serving cluster 150 is shown in FIG. 1 as a single entity. Each serving cluster 150 can include one or more processors 153 configured to execute one or more machine executable instructions or pieces of software, firmware, or a combination thereof. The computing cluster 150 can include, an operating system (not shown) and one or more computer memories 154, for instance a main memory, configured to store one or more pieces of data, either temporarily, permanently, semi-permanently, or a combination thereof. Memory 154 may include any type of storage device that stores information in a format that can be read and/or executed by processor 153, including volatile memory, non-volatile memory, or a combination thereof. The serving cluster 150 can also include one or more segments 140 stored on a tangible computer-readable storage device, for instance disk, flash, or cache, configured to store data in a semi-permanent or non-transient form. The one or more segments 140 may, collectively, be considered the search index. In a distributed search system, the index entries may be stored on several different machines, such as the serving cluster 150.

Segments 140 may represent a logical organization of the documents in the index. Each segment 140 may include a number of posting lists and, optionally, a number of documents. Segments 140 may also include other information, such as document metadata or document ranking information. A posting list may be comprised of a term or phrase and a list of documents or document identifiers that include the term or phrase. In some implementations each document may be associated with one segment 140 and the posting lists for a particular phrase may be distributed amongst several segments 140. In other words, a particular segment 140 may contain a posting list for the terms and phrases of the documents assigned to the particular segment 140. In some implementations the posting list for a particular phrase or term may be assigned to a single segment 140. Some implementations may have only one segment 140 in serving cluster 150.

The terms and phrases of the posting list may be an example of key items and the list of documents or document identifiers may be an example of associated items. The phrases of the posting lists may be assigned to a tier 145 within the segment 140. A tier 145 may represent a logical organization of the posting lists, with lower tiers 145 representing less frequently occurring key items and higher tiers representing more frequently occurring key items. Thus, each segment 140 may have posting lists mapped to different tiers 145 within the segment 140. In some implementations, each tier may be stored in a different kind of memory. For example, tiers 0 and 1 may be stored in disk memory, tier 2 in flash memory, tier 3 in cache memory, etc. Key items, or phrases, appearing the most frequently may be mapped to the highest tier and key items that are not frequent may be mapped to the lowest tier. Thus, for example, segment 140(N) may include posting lists stored on disk, posting lists stored in flash memory, and posting lists stored in cache memory. Each tier 145 may be associated with a maximum limit and/or a minimum limit. The limit may represent the number of associated items each key item may have in the tier. For example, a key item in tier 0 may have 1000 associated items, while a key item in tier 1 may have 10000 associated items but not less than 900 associated items. Such limits may be referred to as tier limits or tier boundaries.

Distributed indexing system 100 may also include indexing system 110. Indexing system 110 can include one or more processors 113 configured to execute one or more machine executable instructions or pieces of software, firmware, or a combination thereof. The indexing system 110 can include, an operating system (not shown) and one or more computer memories 114, for example a main memory, configured to store one or more pieces of data, either temporarily, permanently, semi-permanently, or a combination thereof. The memory may include any type of storage device that stores information in a format that can be read and/or executed by processor 113. Memory 114 may include volatile memory, non-volatile memory, or a combination thereof, and store modules that, when executed by processor 113, perform certain operations. In other implementations, the modules may be stored in an external storage device (not shown) and loaded into memory 114. The modules may enable indexing system 110 to crawl web servers 190 and to retrieve documents hosted by the web servers 190, update the index based on the retrieved documents, and create a tier-map that includes frequency map 131, indexing tier-map 132, and serving tier-map 133.

Frequency map 131 may indicate how many documents contain a particular term or phrase. In other words, the frequency map 131 may indicate how many documents are associated with a particular phrase. The frequency map 131 may be created periodically, for example daily, by tier-map generator 118. For example, the tier-map generator 118 may take the numbers from the previous day and factor in any incremental updates to the index. In some implementations, the frequency map 131 may indicate how many documents in each segment contain the particular phrase. Such a breakdown may help the tier-map generator 118 apply the incremental updates. Frequency map 131 may be stored in memory 114 or in another computer-readable storage device accessible by indexing system 110.

The tier-map generator 118 may also create indexing tier-map 132. Tier-map generator 118 may create indexing tier-map 132 daily, or at some other periodic time, based on past information. Indexing tier-map 132 may indicate the best tier assignment for a particular term at the current time or the time the indexing tier-map 132 is created. Indexing tier-map 131 may be created as part of updating, for example building or refreshing, segments. For example, after tier-map generator 118 builds the frequency map 131, it may determine the tier-mappings for each phrase based on the frequency map 131. For instance, the tier-map generator 118 may use frequency map 131 to determine the amount of documents associated with each phrase and compare the amount to the tier boundaries. If the number of associations is approaching a tier boundary the tier-map generator 118 may assign the phrase to the next tier in the indexing tier-map 132. For example, tier 0 may have a maximum boundary of 100 and tier 1 may have a maximum boundary of 1000 and a minimum boundary of 90. This means that only 100 document identifiers may be associated for a phrase mapped to tier 0, while 1000 may be associated for a phrase mapped to tier 1. If the frequency map 131 indicates a phrase has 100 associations and the phrase was assigned to tier 0, the tier-map generator 118 may assign the phrase to tier 1 in the indexing tier-map 132. As another example, if a phrase has 90 associations and was assigned to tier 1, the tier-map generator 118 may assign the phrase to tier 0 in the indexing tier-map 132. In some implementations, the indexing tier-map may be generated by segment. Thus, the tier-map generator 118 uses the frequency of phrases to determine the best mapping for each particular phrase. Indexing tier-map 132 may be stored in memory 114 or in another computer-readable storage device accessible by indexing system 110.

Indexing system 110 may also include indexer 116. Indexer 116 may crawl web servers 190 for documents, analyze the updated or deleted documents, and update the segments 140 in serving cluster 150 as a result of the analysis. For instance, when indexer 116 encounters a new or updated document from a web server 190, the indexer 116 may determine the terms and phrases contained in the document. For a particular phrase, the indexer may use indexing tier-map 132 to determine what tier the phrase belongs in and may store the association between the phrase and the document in a posting list assigned to that tier. In some implementations, indexer 116 may update the frequency map 131 as associated items are mapped to key items. In such systems the indexer 116 may invoke the tier-map generator 118 to update the indexing tier-map 132 to migrate phrases that are approaching a tier boundary.

Like indexing system 110, search system 120 may include one or more processors 123, an operating system (not shown) and one or more computer memories 124. Search system 120 may include modules, stored in memory 124 or an external storage device (not shown) and loaded into memory 124. For example, search system 120 may include query module 126. Search system 120 may include one or more servers (not shown) that receive queries from a user of client 170 and provide those queries to the search system 120. The search system 120 may be responsible for searching for documents relevant to the search query, also known as search results, ranking the search results, and returning the search results to client 170. Search system 120 may use the search index on serving cluster 150 to identify the search results.

Query module 126 may cause search system to respond to queries. When a query is received, query module 126 may use serving tier-map 133 to determine where to find the documents responsive to the terms of the query. The serving tier-map 133 may include a mapping of posting list entries to segments 140 and, within segment 140, to tiers 145. The serving tier-map 133 may also map posting list entries to tiers 145 and optionally, within tier, to segments 140. A posting list for the same term may be stored in different segments 140 so that segment 140(1) may have the posting list entries for a phrase mapped to tier 1 where segment 140(2) may have posting list entries for the same phrase mapped to tier 0. The serving tier-map 133 may tell query module 126 what tiers contain the posting list entries for each phrase on each segment.

Serving cluster 150 may include segment refresher 155. In some implementations segment refresher 155 may also be in search system 120. Segment refresher 155 may cause serving cluster 150 to update individual segments 140 and serving tier-map 133. For example, indexing system 110 may send updated indexing data to serving cluster 150. When serving cluster 150 receives the updates, segment refresher 155 may update the segments 140 with the new data. In very large indexing systems, each segment 140 may be updated on a rolling basis, so that a complete refresh of the segments 140 may take N days where the serving cluster 150 has N segments. When a particular segment 140 is refreshed, segment refresher 155 may consult indexing tier-map 132 to determine what tier to assign each phrase in its posting lists. As each segment is refreshed, segment refresher 155 may also update the serving tier-map 133 to reflect the tier each phrase in the segment was assigned to.

Indexing system 110 may be communicatively coupled via network 160 to a plurality of web servers 190 storing documents, for example web pages, PDF documents, word processing documents, etc. Search system 120 may be in communication with client(s) 170 over network 160. Network 160 may be for example, the Internet or the network 160 can be a wired or wireless local area network (LAN), wide area network (WAN), etc., implemented using, for example, gateway devices, bridges, switches, and/or so forth. Via the network 160, the indexing system 110 and the search system 120 may communicate with and transmit data to/from web servers 190 and clients 170.

The search system 100 may operate over a large corpus of documents, such as the Internet, but can likewise be used in more limited collections. In either context, documents may typically be distributed across many different computer systems and sites, for example servers 190. Web servers 190 may be any type of computing device accessible over network 160.

Although FIG. 1 nominally illustrates a single computing device executing the indexing system 110, search system 120, and serving cluster 150, a plurality of computing devices, e.g., a distributed computing system, may be utilized to implement any of the depicted systems. For example, indexer 116 may be executed in a first part of such a distributed computing system, while tier-map generator 118 may be executed elsewhere within the distributed system. Additionally, segment 140(1) of serving cluster 150 may be stored on a first server of serving cluster 150 and segment 140(N) may be stored on a second server of serving cluster 150 in the distributed system.

More generally, it may be appreciated that any single illustrated component in FIG. 1 may be implemented using two or more subcomponents to provide the same or similar functionality. Conversely, any two or more components illustrated in FIG. 1 may be combined to provide a single component which provides the same or similar functionality. In particular, as referenced above, the indexing system 110, the search system 120, and the serving cluster 150, although illustrated as separate computing devices, may in fact be executed on the same computing device. Thus, FIG. 1 is illustrated and described with respect to example features and terminologies, which should be understood to be provided merely for the sake of example, and not as being at all limiting of various potential implementations of FIG. 1 which are not explicitly described herein.

Figure 2:
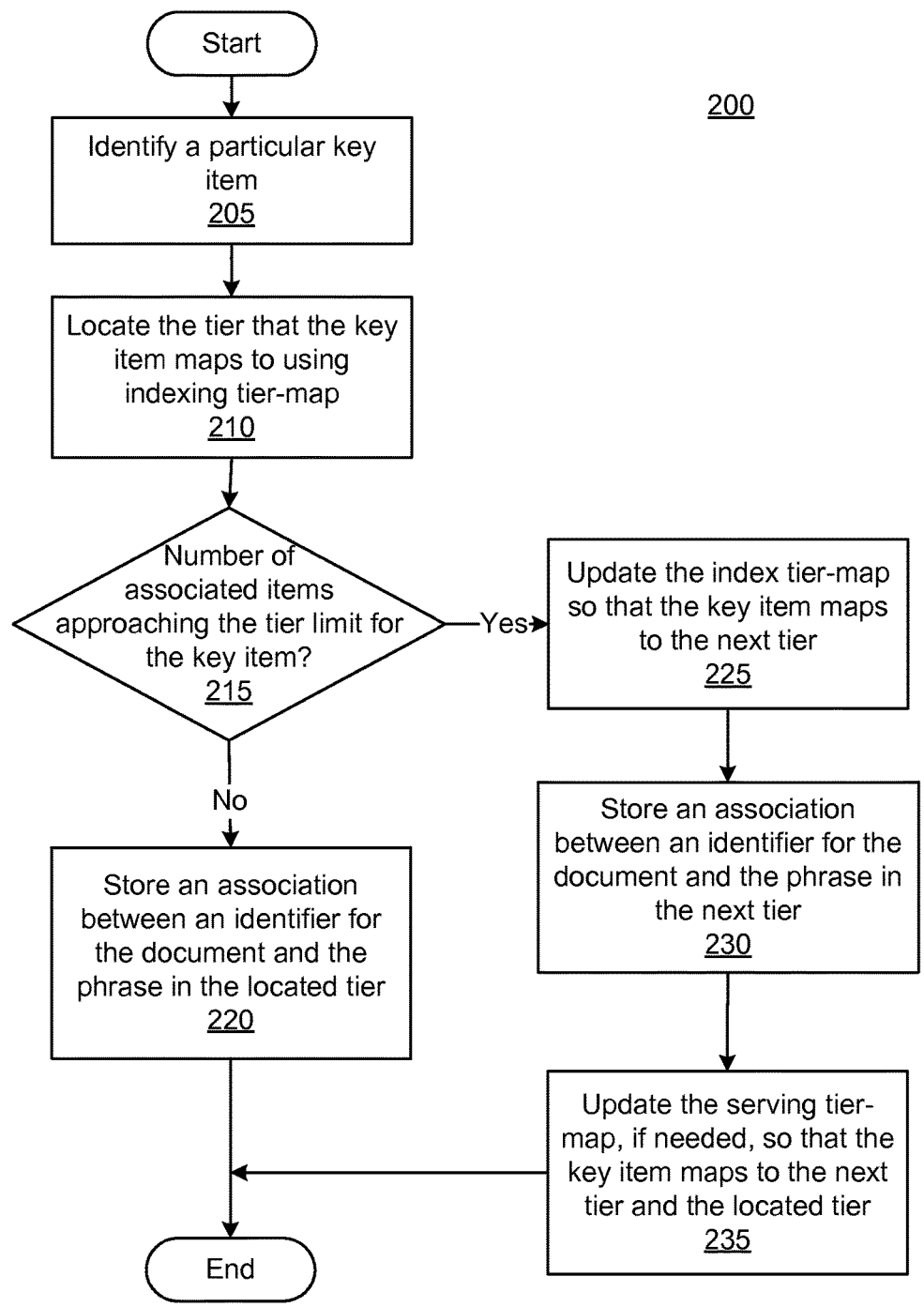
FIG. 2 illustrates a flow diagram of an example process for incrementally updating an indexing tier-map.

FIG. 2 illustrates a flow diagram of an example process 200 for incrementally updating an indexing tier-map, in accordance with the system of FIG. 1. An indexing system, such as indexing system 110 depicted in FIG. 1, may perform process 200 as it processes changes or updates to documents, or as part of a periodic process, for example daily, that maintains the index. The indexing system may perform process 200 to enable key items to receive new tier assignments as the number of associated items changes. Process 200 may begin with the indexing system 110 identifying a particular key item (205). In some implementations the indexing system may update an indexing tier-map, such as indexing tier-map 132 depicted in FIG. 1 continuously, or as documents are indexed, and the key item may be a phrase or term identified in a new or updated document. In some implementations the indexing system may periodically create the indexing tier-map, such as daily, and the key item may be identified from a frequency map, such as frequency map 131 depicted in FIG. 1, or an indexing tier-map from a previous period.

The indexing system may locate the tier that the particular key item currently maps to (210). For example, the indexing system may look at an existing indexing tier-map to determine the current tier. The indexing system may then determine whether the number of associated items for the key item is approaching a tier limit for the current tier (215). For example, the indexing system may look in a frequency map to determine the number of associated items for the key item. In some implementations, if the number of associated items is within a predetermined percentage, such as within 2%, or number, such as within 5, of the limit for the current tier, the indexing system may consider the tier limit to be reached. The tier limit may be a maximum or a minimum limit. If the number of associated items is not approaching the tier limit (215, No), then the indexing system may keep the current tier assignment for the key item and continue to store any new associated items in the current tier (220). For example, in implementations where a new indexing tier-map is created periodically, for example daily, the indexing system may create an entry in the new indexing tier-map that maps the phrase to the current tier. In implementations where the indexing tier-map receives continuous updates, for example, as documents are crawled or indexed, the indexing system may not need to make any changes to the indexing tier-map. The indexing system may then store the key items and any associated items in the current tier.

If the number of associated items does approach the tier limit (215, Yes) then the indexing system may update the indexing tier-map so that the key item maps to the next tier (225). If the tier limit was a maximum limit then the next tier may be a higher tier. If the tier limit was a minimum limit then the next tier may be a lower tier. In some implementations the indexing system may update the current indexing tier-map to reflect the new tier assignment or the indexing system may create a new entry in the new indexing tier-map that reflects the new assignment. The indexing system may then begin storing new associated items with the key item in the next tier (230). The indexing system may also update the serving tier-map to reflect the new mapping to the next tier (235). The serving tier-map may then include a mapping of the key item to the next tier and the original tier. In some implementations, this mapping may be segment specific. The indexing system may repeat process 200 for each phrase encountered, for example in the frequency map or in the newly indexed documents.

The indexing system may use the new/updated indexing tier-map to determine the proper tier assignment for new key item/associated item pairs, for example new posting list entries. In some implementations, the tier assignments in the indexing tier-map may be per segment, so that a particular key item may be assigned to a different tier in two different segments.

Figure 3:
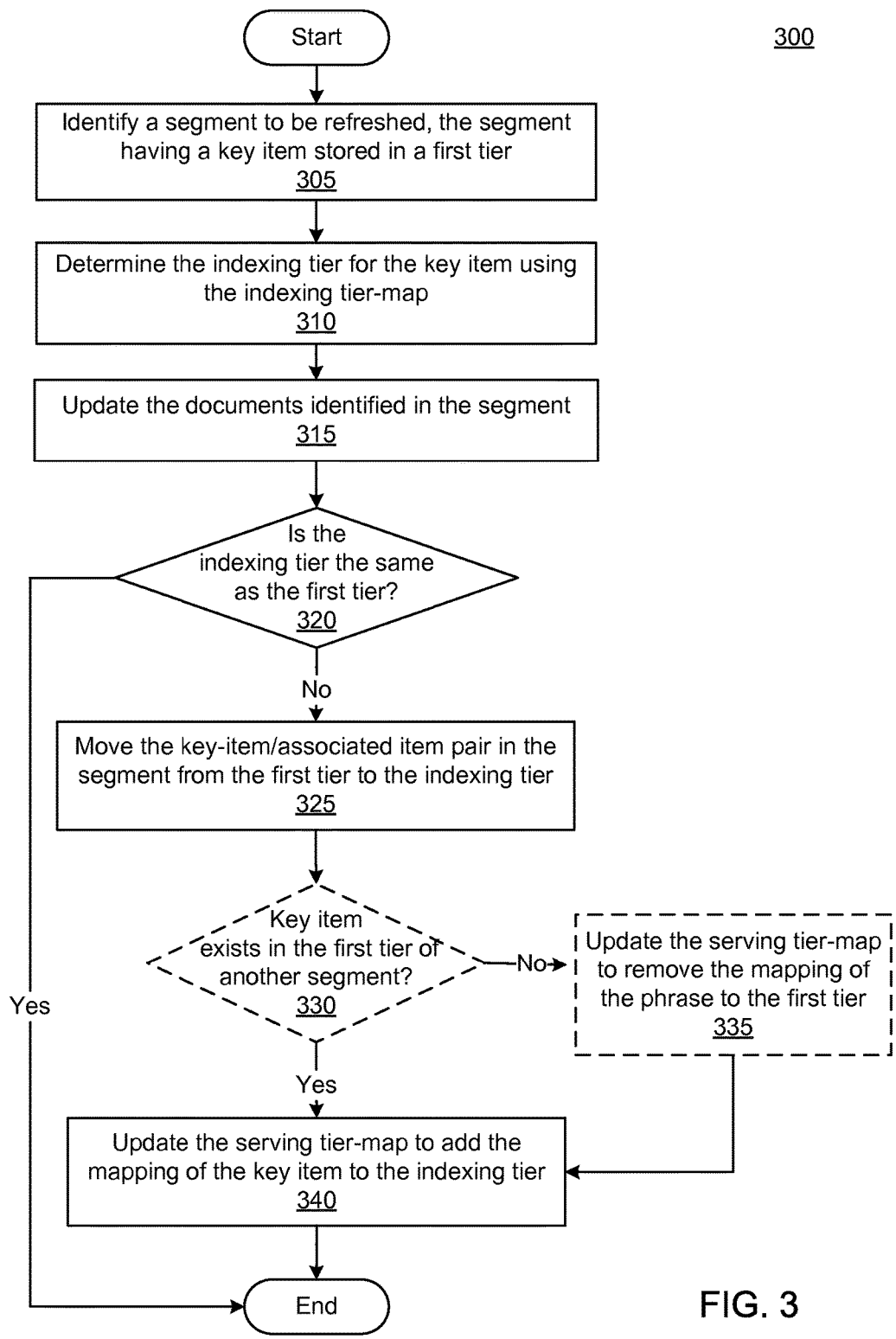
FIG. 3 illustrates a flow diagram of an example process for incrementally updating a serving tier-map.

FIG. 3 a flow diagram of an example process 300 for incrementally updating a serving tier-map, in accordance with disclosed implementations. In a system with a dynamic tier map the indexing tier-map and the serving tier-map may not include the same mapping for a particular key item. In very large indexes, with billions of entries, migrating all data at one time may not be possible without bringing down the index for an unacceptable amount of time. Providing a separate indexing and serving tier-map allows the index entries to migrate from one tier to the next gradually. A query-serving system, such as search system 120 and serving cluster 150 depicted in FIG. 1, may use the serving tier-map to respond to queries. The query-serving system may include a segment refresher that refreshes a portion of the index each day. The segment refresher may perform process 300 as part of a refresh for a particular portion, or segment, of the index being refreshed.

At step 305, the segment refresher may identify a portion of the index, or segment, to be refreshed. The segment may include a key items stored in a first tier. For example, the segment may include a posting list entry for the phrase "sweet tomatoes" stored in tier 1. The segment refresher may determine the current indexing tier for the key item (310). The indexing tier may be the tier that the key item is currently mapped to in the indexing tier-map. For instance, the phrase "sweet tomatoes" may be associated with tier 2 in the indexing tier-map. The segment refresher may update the documents of the segment (315). For example, the segment refresher may update document contents or delete documents no longer included in the index corpus. The segment refresher may determine whether the indexing tier is the same as the first tier for the particular key item (320). For example, the segment refresher may compare the tier assignment from the indexing tier-map to the tier assignment for the key item in the segment (the first tier). If the tier assignments are the same (320, Yes), process 300 may be complete for the particular phrase. If the tiers differ (320, No), segment refresher may move the key item and its associated values from the first tier to the indexing tier (325). For example, for the phrase "sweet tomatoes" the segment refresher may determine that the tier assignment has changed and move the posting list entry for "sweet tomatoes" from tier 1 to tier 2. In some implementations this may include moving the posting list to a different type of memory.

In some implementations the segment refresher may determine whether the particular key item exists in the first tier in another segment (330). This may be needed when the serving tier-map includes tier assignments by key item, e.g., phrase, only and not by key item and segment. If the key item does not exist in other segments (330, No), the segment refresher may update the serving tier-map to remove the mapping of the phrase to the first tier (335). This occurs because no segments are left that contain the old tier mapping, so the old mapping can be removed from the serving tier-map. The segment refresher may then update the serving tier-map to add the mapping of the phrase to the indexing tier (340). In some implementations, this step may be optional because the entry may already exist. For example the indexer may have added the entry or a refresh of a previous segment may have caused the entry to be added. Process 300 may the end for the particular key item. Segment refresher may perform process 300 for each key item associated with the segment being refreshed.

A discussion of how the frequency map, the indexing tier-map, and the serving tier-map work together to migrate a key item from one tier to another tier in a document indexing system follows. In this example the indexing system includes three tiers. Tier 0 has a maximum limit of 100 associated items, tier 1 has a maximum limit of 1000 items, and tier 2 may not have a maximum limit but has a minimum limit of 900 items, tier 1 has a minimum limit of 90 items, and tier 0 may not have a minimum limit. Such limits are exemplary and implementations may have much higher limits. In this example, a particular phrase, or key item assigned to tier 0 may be associated with 99 different document identifiers. The 99 identifiers may be divided amongst 4 segments, with the documents in each segment being refreshed every 4 days. Thus, in this example, a complete refresh of the posting lists (phrases and their associated document ids) and documents in the index takes 4 days. In this example, the frequency map reflects the 99 associated items for the phrase and the indexing tier-map and serving tier-map both indicate the phrase maps to tier 0.

In this example, the indexing system may, when it builds the indexing tier-map or as it indexes a new document, determine that 99 associations reaches the threshold for tier 0. This may occur because 99 falls within a predetermined quantity, such as a number or percentage, of the tier limit of 100. Therefore, the indexing system may map the phrase to tier 1 in the indexing tier-map. This may occur when the indexing system builds the tier-map or as the indexing system encounters a new document that contains the phrase. Thereafter, as the indexing system adds documents to the index, document identifiers for documents that contain the phrase will be added to tier 1. However, the older posting list entries for the phrase added prior to the change to the indexing tier-map will still exist on tier 0 in the 4 segments previously described. Therefore the serving tier-map may be updated to reflect that the posting list entries for the phrase can be found in tier 1 as well as tier 0.

As the first of the four segments is refreshed, the segment refreshing process may determine that the indexer has mapped the phrase to tier 1 and, in response, will move the posting list entries for the phrase from tier 0 to tier 1 in the segment being refreshed. On a second day the segment refreshing system will refresh a second segment and move the posting list entries for the phrase in the second segment from tier 0 to tier 1. Thus after two days the older posting list entries in two segments have migrated, while the older posting list entries in the remaining two segments have not. Thus, the serving tier-map still indicates the phrase maps to two tiers. After four days, a complete refresh cycle in this example, all segments will have gone through a refresh process, causing all posting list entries for the phrase to migrate to tier 1, so that all instances of the phrase will now appear in tier 1. After the last segment refresh the segment refresh process may update the serving tier-map to remove the mapping of the phrase to tier 0.

In some circumstances, key items may migrate from, for example, tier 0 to tier 2 in a short time, so that the serving tier-map may contain associations to three tiers instead of two. For example, if a phrase that was once infrequent suddenly becomes frequent, the phrase may move from tier 0 to tier 2 before each portion of the index has undergone a refresh. Disclosed implementations can manage such rapid changes simply by having multiple entries in the serving tier-map. Furthermore, as a phrase becomes less popular it may move down tiers in a similar manner, but comparing the number of associated items to the minimum tier boundaries. In the example above, if another phrase is mapped to tier 1 and currently has 91 entries, the indexing system may initiate a migration of the posting list entries for the phrase from tier 1 to tier 0. Thus, disclosed implementations may migrate phrases to higher tiers or lower tiers.

In some implementations the indexing tier-map and the serving tier-map may be segment specific. In such implementations, the indexing tier-map may indicate that documents including the phrase "candy" map to tier 0 when stored in segment A, to tier 1 when stored in segment B, and to tier 3 when stored in segment C. In this example, portions of the indexing tier-map may be built when a segment is refreshed. Likewise, the serving tier-map may include tier assignments by segment. For example, the serving tier-map may indicate that documents including the phrase "candy" map to tiers 0 in segment A, to tier 0 and 1 in segment B, and to tier 2 in segment C. In such an implementation tier assignments in the indexing tier-map may be calculated, for example using the frequency map from the new segment(s) being built, before assigning the posting lists to specific tiers in those segments.

The indexing tier-map may be updated using various techniques. For example, the indexing tier-map may be updated periodically, independently of segment refreshes. In such an implementation the indexing tier-map may become a little stale and may not handle rapidly increasing associations for a particular phrase, depending on the period chosen. In some implementations the indexing tier-map may be updated continuously, or on an on-going basis, as documents are crawled or indexed.

In some implementations, the indexing system may update the indexing tier-map during a daily refresh of some or all of the segments. To update the indexing tier-map, the indexing system may collect information regarding the posting lists that will be present in the refreshed segments and information regarding how many entries each posting list has in each segment. When segments are refreshed in parallel, the information regarding how many entries each posting list will have may be synchronized or unsynchronized. For example, the phrase "widget" may have 20 associations in segment A, 15 associations in segment B, 5 associations in segment C, and 20 associations in segment D. Thus, the total number of associations is 50, and the indexing tier-map may map "widget" to tier 0, which has a tier limit of 100. Overnight, "widget" may become popular, appearing in several new documents. Segments A and B may be scheduled for a parallel refresh and may be associated with the new documents. For example, the indexing system may determine that segment A will have 50 associations with the phrase "widget" after the refresh and segment B will have 45 associations for the phrase "widget" after the refresh. When not synchronized, the indexing system may use the number of entries in each segment for a previous day for all but the segment being refreshed. This may cause the system not to begin migration of "widget" to tier 1 because the indexing system uses the prior information for segment B (15 associations) rather than the new associations for segment B (45 associations) when determining the total number of associations for "widget" when refreshing segment A. The same occurs with the parallel refresh of segment B, using the prior information for segment A (10 associations) rather than the new information (50 associations).

In other implementations, several segments may be built or refreshed in parallel with synchronizing between segments. In such embodiments, the indexing system will account for all updates to a phrase before determining tier assignments. In the example above, the updated information would reflect 115 associations total (50+40+5+20) for "widget" when refreshing segments A and B. Thus, the indexing tier-map may be updated to map to tier 1 instead of tier 0 for "widget" and the 50 associations for segment A would be added in tier 1 as would the 40 associations for tier B.

FIG. 4 shows an example of a generic computer device 400, which may be system 100, client 170, and/or websites 190 of FIG. 1, and a generic mobile computer device 450, which may be a client device, such as client 170 of FIG. 1, both of which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In some implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is one example. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. An entire system, such as system 100, may be made up of multiple computing devices 400 communicating with each other. For example, system 100 of FIG. 1 may include a server 420 or rack servers 424 as indexing system 110, a separate computing device 400 as search system 120, and one or more servers 420 or rack servers 424 as serving cluster 150. Other configurations are possible.

Computing device 450 may include a processor 452, memory 464, an input/output device such as a display 454, a communication interface 466, a GPS (Global Positioning System) receiver module 470, and a transceiver 468, among other components. Each of the components 450, 452, 464, 454, 466, and 468, are interconnected using various buses, and several of the components may be mounted on a common motherboard or in other manners as appropriate.

Processor 452 may communicate with a user through control interface 458 and display interface 456 coupled to a display 454. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. The memory 464 may include expansion memory 474 provided through expansion interface 472. Device 450 may communicate wirelessly through communication interface 466, which may include digital signal processing circuitry where necessary.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450. The computing device 450 may be implemented in a number of different forms, as shown in the figure. For example, it may be implemented as a cellular telephone 480. It may also be implemented as part of a smart phone 482, personal digital assistant, or other similar mobile device.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising:
   at least one processor; and
   memory storing:
      an index that links key items with one or more associated items, the index being partitioned into at least a first tier and a second tier, the key items including a first key item with associated items in the first tier and in the second tier,
      an indexing tier-map that maps the first key item with the second tier,
      a serving tier-map that maps the first key item with the first tier and with the second tier, the indexing tier map and the serving tier map allowing a key item to move up or down a tier without having to interrupt system response time with a complete mapping refresh, and
      instructions that, when executed by the at least one processor, cause the system to:
         use the serving tier-map to retrieve associated items from the first tier and from the second tier in response to a query related to the first key item,
         determine, during an update of a portion of the associated items for the first key item, the portion of the associated items being stored with the first key item in the first tier, that the first key item is associated with the second tier in the indexing tier map, and
         responsive to determining the first key item is associated with the second tier in the indexing tier map, move the associated items for the portion from the first tier to the second tier.

2. The system of claim 1, where the key items represent terms found in a document corpus and the associated items represent document identifiers of documents in the corpus.

3. The system of claim 1, the instructions further including instructions that, when executed by the at least one processor, cause the system to:
   receive a new associated item for the first key item; and
   store the new associated item with the first key item in the second tier based on the indexing tier-map.

4. The system of claim 1, wherein the first tier has a first tier boundary representing a limit for associated items per key item and the second tier has a second tier boundary representing a limit for associated items per key item.

5. The system of claim 4, the instructions further including instructions that, when executed by the at least one processor, cause the system to:
   receive a new associated item for the first key item;
   determine whether the new associated item causes an amount of associated items in the second tier for the first key item to approach the second tier boundary; and
   store the new associated item in the second tier in response to determining that the amount does not approach the second tier boundary.

6. The system of claim 5, the instructions further including instructions that, when executed by the at least one processor, cause the system to, in response to determining that the amount approaches the second tier boundary:
   replace the mapping of the first key item to the second tier in the indexing tier-map with a mapping of the first key item to a third tier;
   store the new associated item in the third tier; and
   add a mapping of the first key item to the third tier in the serving tier-map.

7. The system of claim 5, the memory further storing a frequency map and determining whether the amount approaches the second tier boundary includes consulting the frequency map.

8. The system of claim 1, the instructions further including instructions that, when executed by the at least one processor, cause the system to:
   during the update of the portion, determine whether remaining associated items for the first key item are stored in the first tier; and
   delete, in the serving tier-map, the mapping of the first key item with the first tier in response to determining that no remaining associated items for the first key item are stored in the first tier.

9. A system comprising:
   at least one processor;
   memory storing:
      an index that links key items with one or more associated items, the index being partitioned into at least a first tier and a second tier, the key items including a first key item with first associated items in the first tier and second associated items in the second tier,
      an indexing tier-map that maps the first key item with the second tier,
      a serving tier-map that maps the first key item with the first tier and the second tier, the indexing tier map and the serving tier map allowing a key item to move up or down a tier without having to interrupt system response time with a complete mapping refresh, and
      instructions that, when executed by the at least one processor, cause the system to:
         determine that the first associated items are in a tier that does not match the tier in the indexing tier-map as part of an update to the index;
         move the first associated items from the first tier to the second tier responsive to determining that the first associated items are in the tier that does not match; and
         update the serving tier-map to remove the mapping of the first key item with the first tier.

10. The system of claim 9, the instructions further including instructions that, when executed by the at least one hardware processor, cause the system to:

determine whether the first tier stores additional associated items for the first key item; and perform the update of the serving tier-map to remove the mapping in response to determining that the first tier does not store additional associated items for the first key item.

11. The system of claim 9, wherein the index is partitioned into segments, the first key item having a first portion of the first associated items stored in a first segment and a second portion of first associated items stored in a second segment, and the instructions further include instructions that, when executed by the at least one processor, cause the system to:

as part of the update to the index, determine first new associated items for the key item in the first segment and determine second new associated items for the key item in the second segment;

use the first new associated items and the second new associated items to determine whether a quantity of associated items for the first key item approaches a tier boundary for the second tier; and move the first associated items from the first tier to the second tier when the quantity of associated items does not approach the tier boundary.

12. The system of claim 11, the instructions further including instructions that, when executed by the at least one processor, cause the system to:

determine that the quantity approaches the boundary and, in response:

replace the mapping of the first key item to the second tier with a mapping of the first key item to a third tier in the indexing tier-map;

move the first associated items from the first tier to the third tier; and add a mapping of the first key item to the third tier to the serving tier-map.

13. The system of claim 9, wherein the index is partitioned into segments, the first key item having the first associated items stored in a first segment of the first tier and the second associated items stored in the first segment of the second tier, and the indexing tier-map is a first indexing tier-map for the first segment, and the serving tier-map is a first serving tier-map for the first segment, the memory further storing:

a second indexing tier-map for a second segment, the second indexing tier-map mapping the first key item to the first tier;

a second serving tier-map for the second segment, the second serving tier-map mapping the first key item to the first tier; and instructions that, when executed by the at least one processor, cause the system to:

receive a query that relates to the first key item;

use the first serving tier-map to retrieve the first associated items in the first tier and the second associated items in the second tier;

use the second serving tier-map to retrieve third associated items for the first key item in the first tier; and generate a search result for the query based in the retrieved associated items.

14. The system of claim 9, where the key items represent terms found in a document corpus and the associated items represent document identifiers of documents in the corpus.

15. A method comprising:

storing an index that links key items with one or more associated items, the index being partitioned into at least a first tier and a second tier, the key items including a first key item with associated items in the first tier and in the second tier;

storing an indexing tier-map that maps the first key item with the second tier;

storing a serving tier-map that maps the first key item with the first tier and with the second tier, the indexing tier map and the serving tier map allowing a key item to move up or down a tier without having to interrupt system response time with a complete mapping refresh; and using the serving tier-map to retrieve associated items from the first tier and from the second tier in response to a query related to the first key item;

determining, during an update of a portion of the associated items for the first key item, the portion of the associated items being stored with the first key item in the first tier, that the first key item is associated with the second tier in the indexing tier map; and responsive to determining that the first key item is associated with the second tier in the indexing tier map, moving the associated items for the portion from the first tier to the second tier.

16. The method of claim 15, further comprising:

receiving a new associated item for the first key item; and using the indexing tier-map to store the new associated item with the first key item in the second tier.

17. The method of claim 15, wherein the first tier has a first tier boundary representing a limit for associated items per key item and the second tier has a second tier boundary representing a limit for associated items per key item.

18. The method of claim 17, further comprising:

receiving a new associated item for the first key item;

determining whether the new associated item causes an amount of associated items in the second tier for the first key item to approach the second tier boundary;

in response to determining that the amount does not approach the second tier boundary, storing the new associated item in the second tier; and in response to determining that the amount approaches the second tier boundary:

replacing the mapping of the first key item to the second tier in the indexing tier-map with a mapping of the first key item to a third tier, storing the new associated item in the third tier, and adding a mapping of the first key item to the third tier in the serving tier-map.

19. The method of claim 15, further comprising, during the update of the portion:

determining whether remaining associated items for the first key item are stored in the first tier; and deleting the mapping of the first key item with the first tier in response to determining that no remaining associated items for the first key item are stored in the first tier.

* * * * *